Jan. 8, 1957    O. C. NIEDERER ET AL    2,776,528
EGG SUPPORTING MEANS IN EGG CLEANING MECHANISM
Filed Dec. 31, 1952

INVENTORS
OTTO C. NIEDERER
OTTO NIEDERER
BY HERBERT O. NIEDERER
Albert Sperry
ATTORNEY United States Patent Office 2,776,528
Patented Jan. 8, 1957

2,776,528

EGG SUPPORTING MEANS IN EGG CLEANING MECHANISM

Otto C. Niederer, Otto Niederer, and Herbert O. Niederer, Titusville, N. J.

Application December 31, 1952, Serial No. 328,874

4 Claims. (Cl. 51—216)

This invention relates to egg cleaning mechanism and is directed particularly to constructions by which eggs are supported during a cleaning operation.

There are various types of egg cleaning equipment wherein eggs are moved through the device while in engagement with a support. The support necessarily must be yieldable to prevent injury to the eggs and it is usual to form the support of porous, cellular or sponge rubber. However, the compression and expansion of such porous or cellular supports causes air carrying the dust and dirt from the egg shells to be drawn into the pores of the rubber and to become embedded therein causing the rubber to harden and deteriorate relatively quickly. Moreover, when the support is in the form of a belt which passes about a pulley the porous rubber is so stretched in passing about the pulley that it soon looses its elasticity and tends to crack, break or crumble.

In accordance with the present invention a novel type of egg support for egg cleaning mechanism is provided wherein solid, that is non-porous rubber, may be used while at the same time the eggs are yieldably supported and more positively held, moved and positioned than has been possible heretofore. The supporting means further lends itself ideally for use in the form of a continuous belt or conveyor and serves to aid in lowering and discharging the eggs from the end of the conveyor.

These results are attained by providing egg supporting means in the form of an elongated strip presenting a plurality of longitudinally extending yieldable fins or ribs of such height in comparison with their thickness that they are readily flexed and are capable of folding sideways upon each other when placed under tension as they pass about a roller or pulley.

One of the objects of the present invention is to provide a novel type of egg support for use in egg cleaning equipment.

Another object of the invention is to increase the life and durability of egg supporting belts used in egg cleaning equipment.

A particular object of the invention is to provide an egg supporting belt which has a plurality of flexible fins extending longitudinally thereof which are sufficiently tall, thin and flexible to present a yieldable egg supporting surface.

These and other objects and features of the present invention will appear from the following description thereof in which reference is made to the figures of the accompanying drawing.

Figure 1:
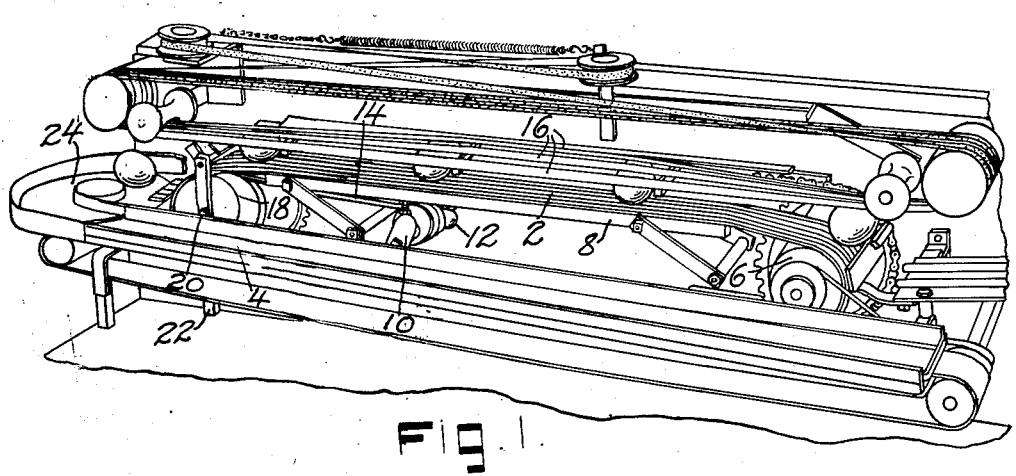
Fig. 1 is a perspective of a portion of a typical egg cleaning device embodying the present invention.

In that form of the invention chosen for purposes of illustration in the drawing the egg cleaning means of Fig. 1 is of the type shown and described in our issued Patent No. 2,579,604. In this type of equipment the eggs to be cleaned are supplied to an egg supporting and conveying belt 2 which is moved lengthwise through the device passing about the pulleys 4 and 6 adjacent the feeding and delivery ends of the equipment. The belt 2 travels over bars 8 which are located beneath and adjacent the opposite edges of the belt and are alternately raised and lowered so as to tilt the belt transversely and cause the eggs to be oscillated as they travel lengthwise through the machine. The bars 8 are actuated by means of eccentrics 10 and 12 driven by the belt 14. During their travel through the machine, the eggs are engaged by a plurality of flexible abrasive bands 16 which are spaced from the belt 2 a distance somewhat less than the diameter of the eggs to be cleaned. The bands move longitudinally of the equipment generally parallel to the belt and preferably in a direction opposite to that in which the eggs move from the receiving end to the discharge end of the device. As the eggs approach the discharge end of the device they engage a releasing member 18 which is pivotally mounted at 20 and controlled by a counterweight 22 so that the eggs are lowered gradually from the belt 2 to a receiving table 24.

Figure 2:
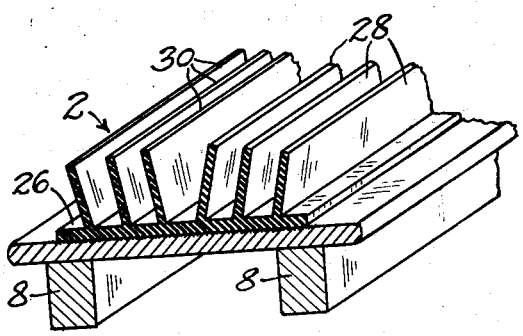
Fig. 2 is an enlarged perspective of a portion of a typical egg supporting and conveying means embodying the present invention.

In accordance with the present invention the egg supporting and conveying means, such as the belt 2, is of the type illustrated in cross section in Fig. 2. This belt is formed on its outer surface with a base 26 having a plurality of longitudinally extending fins 28 and 30 which project upwardly from the base 26 and are arranged in generally parallel relation lengthwise of the belt. The fins are thin and flexible and generally may be from 5 to 10 times as wide in their vertical height as they are in thickness. The fins, therefore, are easily flexed so that they present a yielding cushioned surface for engagement with the eggs. At the same time, the rubber or other material of which the fins are formed is preferably solid, that is non-porous, so that it does not present any pores or openings for taking up the dust resulting from the action of the abrasive material in cleaning the eggs.

Figure 4:
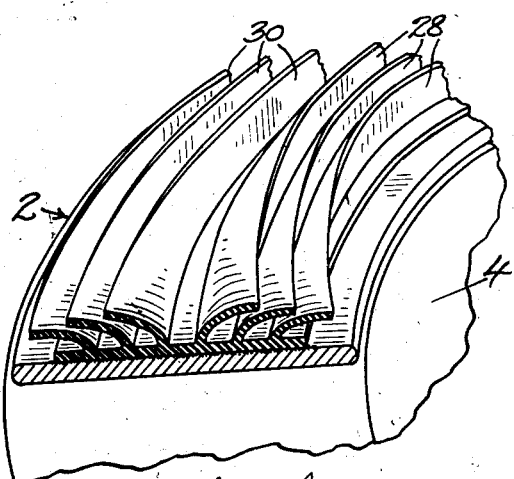
Fig. 4 is a perspective illustrating the action of the egg supporting means in passing about a pulley.

As further shown in Fig. 2, the fins 28 located on one side of the center of the belt are preferably inclined slightly in one direction whereas the fins 30 on the opposite side of the center of the belt are similarly inclined in the opposite direction. The fins located adjacent the center of the belt also may be somewhat longer than the outer marginal fins so as to combine in presenting a somewhat crowned or arched upper surface. However, the angular inclination of the fins causes the fins on each side of the center of the belt to flex in the same direction when engaging an egg and under substantially all conditions of use. Furthermore, as shown in Fig. 4 when the belt passes around a pulley the longitudinal tension exerted on the fins due to the greater diameter of the periphery of the fins causes the fins to fold sideways into overlapping relation as shown in Fig. 4. In thus folding sideways, the fins actually serve to disengage the eggs and release them from the belt for ready discharge. On the other hand, at the receiving end of the device, the eggs when presented to the belt are raised upward by the resilient fins 28 and 30 as they return to upright positions, thereby bringing the eggs gradually and yieldably into engagement with the abrasive material.

Figure 3:
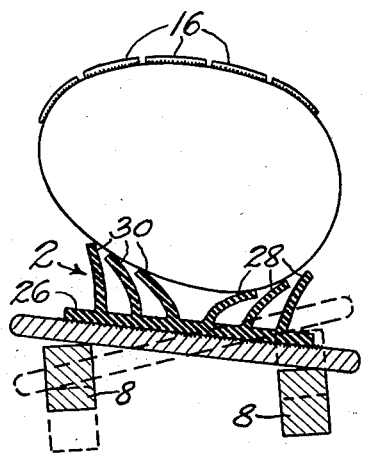
Fig. 3 is a transverse sectional view showing the conveying means in a typical tilted position which it may assume.

During longitudinal movement of the belt and eggs, the belt is tilted transversely to the position shown in Fig. 3 whereupon the eggs alternately press against and deflect the fins 28 more than the fins 30, whereas on tilting of the belt in the opposite direction, the fins 30 are flexed to a greater extent than the fins 28. This increased flexing of the fins on tilting of the belt serves to urge the lower or tilted end of the egg more forceably upward against the abrasive means so that the eggs are not at anytime disengaged from the abrasive bands despite the tilting of the belt. Moreover, the increased flexing and frictional engagement of the eggs by the flexed fins on the lower side of the belt aids in preventing displacement of the eggs and as a result they cannot slip sideways off the belt during the oscillation era. In fact, the eggs are found in practice to become centered on the belt automatically as they travel along the belt even when intentionally displaced in starting through the machine.

The flexible fins of the present invention have a further important advantage in that they act with equal effectiveness upon the small "pee-wee" eggs and upon the largest or "jumbo" eggs. The smaller eggs, being lighter, are held elevated to a greater extent by the fins so as to urge the eggs upward into engagement with the abrasive means while the fins undergo limited flexing. On the other hand, the larger and heavier eggs flex the fins to a greater extent due to their increased weight so that the jumbo eggs also are held in proper cleaning engagement with the abrasive means. The action of the cleaning elements upon the eggs is, therefore, substantially uniform independently of the size of the eggs of being supplied to the equipment.

It is further found in practice that the life of belts embodying the present invention is several times that of belts in which the egg supporting means are formed of porous or cellular material. This is believed to be due to the fact that the porous supporting material of prior egg supports when compressed or flexed necessarily expels and takes in air together with the dust and dirt removed from the eggs. The dust and dirt, therefore, become imbedded in the rubber and alters its physical properties causing it to split, crack and crumble after rather limited periods of use. In contrast, the egg supporting means of the present invention may be formed of solid, that is non-porous, rubber or similar flexible material. The rubber or the other material of which the belt is made may be readily cleaned in the event an egg should be broken while being cleaned and it is possible to dust out the spaces between the fins on the belt while the machine is in operation.

The egg supporting means of the present invention thus presents a yieldable cushioned surface for receiving the eggs and serves automatically to adjust itself to the size of the eggs and conditions of movement and operation of the belt and other elements of the cleaning equipment. Greater uniformity in operation is obtained and the life of the belt or supporting means is increased materially.

While a particular form of egg conveying belt has been described it will be apparent that egg supporting means embodying the present invention may be used in other types of egg cleaning equipment such, for example, as that shown and claimed in our issued Patent No. 2,579,603. The supporting means may, in fact, be used in any locations where it is desired to support or move fragile articles such as eggs. In view thereof it should be understood that the particular embodiment of the invention shown in the drawings and described above is intended to be illustrative only and is not intended to limit the scope of the invention.

We claim:

1. In an egg cleaning device having a longitudinally extending support for the eggs to be cleaned, and means for oscillating said support transversely, means on the egg engaging surface of the support presenting a plurality of fins spaced apart and located on opposite sides of the center line of the support with the fins nearest the center of the support being higher than those adjacent the edges thereof, said fins extending lengthwise of the support and being formed of resilient flexible material and being flexible transversely to provide a crowned yieldable egg supporting surface.

2. A continuous belt for use in egg cleaning mechanism comprising a base having on each side of the center line of the belt a plurality of longitudinally extending relatively thin and transversely flexible ribs projecting outward from said base, those ribs on one side of the center of said belt being inclined away from those ribs on the opposite side of the belt and all of said ribs being formed of non-porous rubber and laterally deformable upon oscillation of an egg in engagement therewith.

3. A continuous belt for use in egg cleaning mechanism comprising a base having on each side of the center line of the belt a plurality of longitudinally extending relatively thin and transversely flexible ribs projecting outward from said base, those ribs on one side of the center of said belt being inclined away from those ribs on the opposite side of the belt and all of said ribs being foldable transversely upon passage of the belt about a pulley.

4. Means for supporting eggs in an egg cleaning mechanism comprising an elongated base having longitudinally extending, relatively thin and transversely flexible fins projecting upward from the base and arranged with a plurality of such fins on each side of the center line of the base, the fins on one side of said center line being transversely inclined oppositely and outwardly with respect to the fins on the other side of the center line, the upper edges of the fins adjacent the center line of the base projecting above the upper edges of the fins spaced from said center line and all of said edges cooperating to present a transversely crowned egg engaging surface for supporting eggs in spaced relation with respect to the base of the belt.

References Cited in the file of this patent

UNITED STATES PATENTS

| | | |
|---|---|---|
| 381,456 | Woodbury | Apr. 17, 1888 |
| 979,200 | Prosser | Dec. 20, 1910 |
| 1,484,248 | Austin | Feb. 19, 1924 |
| 1,931,565 | White | Oct. 24, 1933 |
| 2,555,193 | Johnson | May 29, 1951 |
| 2,578,944 | Ramont | Dec. 18, 1951 |
| 2,579,604 | Niederer et al. | Dec. 25, 1951 |